US011856514B2

United States Patent
Xu et al.

(10) Patent No.: US 11,856,514 B2
(45) Date of Patent: Dec. 26, 2023

(54) RADIO RESOURCE CONFIGURATION ADJUSTMENT METHOD, APPARATUS, AND SYSTEM

(71) Applicant: Huawei Technologies Co., Ltd., Shenzhen (CN)

(72) Inventors: Haibo Xu, Beijing (CN); Jian Wang, Beijing (CN); Yongbo Zeng, Beijing (CN); Liping Chen, Xi'an (CN); Hongyue Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 16/477,790

(22) PCT Filed: Jan. 4, 2018

(86) PCT No.: PCT/CN2018/071414
§ 371 (c)(1),
(2) Date: Jul. 12, 2019

(87) PCT Pub. No.: WO2018/130115
PCT Pub. Date: Jul. 19, 2018

(65) Prior Publication Data
US 2020/0128479 A1 Apr. 23, 2020

(30) Foreign Application Priority Data

Jan. 13, 2017 (CN) .......................... 201710026111.3
Mar. 25, 2017 (WO) ................ PCT/CN2017/078228

(51) Int. Cl.
*H04W 52/02* (2009.01)
*H04W 76/30* (2018.01)
(Continued)

(52) U.S. Cl.
CPC ...... *H04W 52/0209* (2013.01); *H04B 7/0413* (2013.01); *H04W 8/24* (2013.01);
(Continued)

(58) Field of Classification Search
CPC ... H04W 8/24; H04W 24/02; H04W 52/0209; H04W 52/0206; H04W 76/30;
(Continued)

(56) References Cited

U.S. PATENT DOCUMENTS 9,253,729 B1 * 2/2016 Sundar ............. H04W 52/0261
2004/0160901 A1 8/2004 Raith
(Continued)

FOREIGN PATENT DOCUMENTS

| CN | 101753658 A | 6/2010 |
| CN | 101834644 A | 9/2010 |

(Continued)

OTHER PUBLICATIONS

Azuma, Wireless communication device (translation of JP 201193141 A), Sep. 2011, European Patent Office, whole document (Year: 2011).*

(Continued)

*Primary Examiner* — Michael Thier
*Assistant Examiner* — Jose L Perez
(74) *Attorney, Agent, or Firm* — Conley Rose, P.C.

(57) ABSTRACT

A radio resource configuration adjustment method includes detecting, by user equipment, an overheating problem or that the overheating problem is alleviated, and sending, by the user equipment, a first message to a network device, where the first message is used to notify the network device that the overheating problem occurs in the user equipment or the overheating problem is alleviated; receiving, by the user equipment, a response message sent by the network device, where the response message is used to instruct the user (Continued)

equipment to perform one of the following operations, and the operations include deactivating a secondary serving cell, activating a secondary serving cell, releasing a secondary serving cell, and adding a secondary serving cell; and deactivating, by the user equipment, a secondary serving cell, or activating a secondary serving cell, or releasing a secondary serving cell, or adding a secondary serving cell according to the response message.

20 Claims, 4 Drawing Sheets

(51) Int. Cl.
  *H04W 76/27* (2018.01)
  *H04B 7/0413* (2017.01)
  *H04W 8/24* (2009.01)
  *H04W 24/10* (2009.01)

(52) U.S. Cl.
  CPC ....... *H04W 24/10* (2013.01); *H04W 52/0206* (2013.01); *H04W 76/27* (2018.02); *H04W 76/30* (2018.02)

(58) Field of Classification Search
  CPC . H04W 52/0251; H04W 76/27; H04W 76/15; H04W 24/10; H04W 24/00; H04W 76/34; H04W 72/0453; H04W 72/51; H04B 7/0413; Y02D 30/70; H04L 5/001
  See application file for complete search history.

(56) References Cited

U.S. PATENT DOCUMENTS

| | | | |
|---|---|---|---|
| 2004/0174833 A1* | 9/2004 | Raith | H04W 52/36 370/311 |
| 2008/0046132 A1 | 2/2008 | Dalsgaard et al. | |
| 2008/0175334 A1* | 7/2008 | Kuo | H04B 7/0689 375/299 |
| 2009/0215442 A1* | 8/2009 | Lindoff | H04B 1/40 455/423 |
| 2010/0126708 A1 | 5/2010 | Mikami | |
| 2010/0303054 A1 | 12/2010 | Yang et al. | |
| 2010/0323743 A1 | 12/2010 | Huan | |
| 2011/0038432 A1* | 2/2011 | Potkonjak | H04W 52/0225 375/260 |
| 2011/0243002 A1* | 10/2011 | Tsuruoka | H04W 24/04 370/252 |
| 2012/0064909 A1 | 3/2012 | Lindoff et al. | |
| 2012/0106501 A1* | 5/2012 | Kishiyama | H04L 5/0048 370/329 |
| 2013/0017851 A1* | 1/2013 | Kim | H04W 72/048 455/509 |
| 2013/0039173 A1* | 2/2013 | Ehsan | H04W 52/146 370/229 |
| 2013/0040132 A1 | 2/2013 | Nakao et al. | |
| 2013/0201834 A1 | 8/2013 | Klingenbrunn et al. | |
| 2014/0018085 A1* | 1/2014 | Young | H04W 52/0216 455/450 |
| 2015/0078251 A1* | 3/2015 | Clevorn | H04L 1/16 370/328 |
| 2015/0131461 A1 | 5/2015 | Ramkumar et al. | |
| 2015/0201326 A1* | 7/2015 | Kazmi | H04B 7/0619 370/329 |
| 2015/0245250 A1 | 8/2015 | Bhattacharjee et al. | |
| 2015/0256305 A1 | 9/2015 | Yerramalli et al. | |
| 2016/0065723 A1* | 3/2016 | Jung | G06F 3/0484 340/586 |
| 2016/0100360 A1* | 4/2016 | Liu | H04W 52/0258 370/311 |
| 2016/0127998 A1* | 5/2016 | Roessel | H04L 5/0096 370/311 |
| 2016/0157228 A1* | 6/2016 | Yum | H04W 76/27 370/329 |
| 2016/0239057 A1* | 8/2016 | Kocagoez | G06F 11/3024 |
| 2016/0262143 A1* | 9/2016 | Breuer | H04W 76/20 |
| 2016/0295569 A1* | 10/2016 | Braun | H04B 7/0413 |
| 2017/0164220 A1* | 6/2017 | Roessel | H04M 3/42 |
| 2017/0251512 A1 | 8/2017 | Koskinen et al. | |
| 2018/0034524 A1* | 2/2018 | Pao | H04L 5/0053 |
| 2018/0035438 A1* | 2/2018 | Pao | H04W 76/15 |
| 2018/0199185 A1* | 7/2018 | Tenny | H04W 8/22 |
| 2019/0166553 A1* | 5/2019 | Ryoo | H04W 74/0833 |
| 2019/0364492 A1* | 11/2019 | Azizi | H04W 52/0264 |

FOREIGN PATENT DOCUMENTS

| | | | |
|---|---|---|---|
| CN | 102017493 A | | 4/2011 |
| CN | 102625421 A | | 8/2012 |
| CN | 103176889 A | * | 6/2013 |
| CN | 104868974 A | | 8/2015 |
| CN | 105472634 A | | 4/2016 |
| CN | 105578574 A | | 5/2016 |
| CN | 105940757 A | | 9/2016 |
| EP | 3565325 A1 | | 11/2019 |
| JP | 2002531023 A | | 9/2002 |
| JP | 2011193141 A | | 9/2011 |
| JP | 2011193141 A | * | 9/2011 |
| JP | 2012510213 A | | 4/2012 |
| JP | 2013223166 A | * | 10/2013 |
| JP | 2016537935 A | | 12/2016 |
| KR | 20130007737 A | | 1/2013 |
| KR | 20140126732 A | | 10/2014 |
| WO | 2016119261 A1 | | 8/2016 |
| WO | 2017099891 A1 | | 6/2017 |

OTHER PUBLICATIONS

Yanagida, Wireless communication device and wireless communication method (translation of JP 2013223166 A), Oct. 2013 European Patent Office, whole document (Year: 2013).*
Wikipedia entry for MIMO, (web.archive.org/web/20161217080940/ https://en.wikipedia.org/wiki/MIMO), Dec. 2016, whole document (Year: 2016).*
Zheng et al., A Method and device for over-temperature protection to equipment (translation of CN 103,176,889 A), Jun. 26, 2013, SIPO, whole document (Year: 2013).*
Huawei et al., "Thermal issues with high capability UEs," R2-1701835, 3GPP TSG-RAN WG2 #97, Athens, Greece, Feb. 13-17, 2017, 5 pages.
Foreign Communication From A Counterpart Application, European Application No. 18739190.9, Extended European Search Report dated Dec. 6, 2019, 13 pages.
Machine Translation and Abstract of Chinese Publication No. CN101753658, Jun. 23, 2010, 15 pages.
Machine Translation and Abstract of Chinese Publication No. CN101834644, Sep. 15, 2010, 31 pages.
Machine Translation and Abstract of Chinese Publication No. CN105472634, Apr. 6, 2016, 19 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300, V14.1.0, Dec. 2016, 317 pages.
"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321, V14.1.0, Dec. 2016, 98 pages.
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331, V14.1.0, Dec. 2016, 654 pages.
"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 1, Dec. 2016, 7 pages.

(56) References Cited

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 2, Dec. 2016, 41 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 3, Dec. 2016, 222 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 4, Dec. 2016, 81 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 5, Dec. 2016, 51 pages.

"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, Part 6, Dec. 2016, 12 pages.

Foreign Communication From A Counterpart Application, PCT Application No. PCT/CN2017/078228, International Search Report dated Sep. 28, 2017, 7 pages.

Foreign Communication From A Counterpart Application, PCT Application No. PCT/CN2017/078228, Written Opinion dated Sep. 28, 2017, 4 pages.

Foreign Communication From A Counterpart Application, PCT Application No. PCT/CN2018/071414, English Translation of International Search Report dated Mar. 30, 2018, 2 pages.

Foreign Communication From A Counterpart Application, PCT Application No. PCT/CN2018/071414, English Translation of Written Opinion dated Mar. 30, 2018, 4 pages.

R2-1702932, LG Electronics Inc., "Assistance information for UE requested configuration change," 3GPP TSG-RAN2 Meeting #97Bis, Spokane, USA, Apr. 3-7, 2017, 3 pages.

* cited by examiner

RADIO RESOURCE CONFIGURATION ADJUSTMENT METHOD, APPARATUS, AND SYSTEM

CROSS REFERENCE TO RELATED APPLICATIONS

This application is a U.S. National Stage of International Patent Application No. PCT/CN2018/071414 filed of Jan. 4, 2018, which claims priority to Chinese Patent Application No. 201710026111.3 filed on Jan. 13, 2017 and International Patent Application No. PCT/CN2017/078228 filed on Mar. 25, 2017. All of the aforementioned applications are hereby incorporated by reference in their entireties.

TECHNICAL FIELD

The present invention relates to the field of communications technologies, and in particular, to a radio resource configuration adjustment method, a related apparatus, and a system.

BACKGROUND

Currently, a terminal implements high-speed data transmission through carrier aggregation (Carrier Aggregation, CA) and multiple-input multiple-output (Multiple-Input Multiple-Output, MIMO). Carrier aggregation means that a plurality of component carriers (Component Carrier, CC) are aggregated to increase a transmission broadband, thereby increasing a data transmission rate. MIMO means that a plurality of radio frequency receive links and a plurality of radio frequency transmit links are used to increase a transmission channel capacity, thereby increasing a data transmission rate.

As a 3GPP standard evolves, a carrier aggregation capability and a MIMO capability corresponding to the terminal continually improve from 2CC+2MIMO to 3CC+4MIMO to 4CC+4MIMO, and a corresponding data transmission rate continually increases.

Power consumption of the terminal keeps growing during high-speed data transmission, and consequently a temperature of the terminal rises. Heating test data shows that, with 3CC+4*4MIMO, the temperature of the terminal rises to approximately 53° C. within 10 minutes, and the temperature of the terminal rises to 70° C. to 80° C. within about one hour. If no cooling processing is performed on the terminal, a user is scalded or the terminal stops running. When the terminal encounters an overheating problem due to high-speed data transmission, a carrier aggregation configuration or a MIMO configuration corresponding to the terminal needs to be reduced, to reduce the data transmission rate, thereby reducing the temperature of the terminal.

In the prior art, the carrier aggregation configuration or the MIMO configuration of the terminal is reduced by using the following two solutions, to alleviate the overheating problem of the terminal.

A first solution includes the following steps:

Step 1: When the temperature of the terminal reaches a critical value, the terminal initiates a detach (detach) process, and exits a network.

Step 2: The terminal initiates an attach (re-attach) process, accesses the network, and reports, to a network device, that the terminal currently cannot support a carrier aggregation function or a MIMO function.

Step 3: The terminal receives configuration information of the network device, and runs for a period of time over a single CC or single-MIMO. After the heat problem is alleviated, the terminal initiates a detach process, and exits the network.

Step 4: The terminal initiates a re-attach process, accesses the network, and reports, to the network device, a carrier aggregation configuration or a MIMO configuration currently supported by the terminal.

Step 5: The terminal receives carrier aggregation configuration information or MIMO configuration information of the network device, and runs over a plurality of CCs or multi-MIMO.

In the first solution, because the carrier aggregation configuration or the MIMO configuration supported by the terminal changes, the terminal needs to re-register with the network after exiting the network, to adjust the carrier aggregation configuration or the MIMO configuration, thereby achieving a cooling purpose. In the first solution, exiting the network causes poor user experience of the terminal.

In a second solution, if the terminal encounters the overheating problem due to an excessively high carrier aggregation configuration, the second solution may include the following steps.

Step 1: When the temperature of the terminal reaches a critical value, a terminal side proactively deactivates a specific quantity of secondary serving cells (Secondary Cell, Scell). The terminal reports, on a component carrier corresponding to the deactivated SCell, that a channel quality indicator (channel quality indication, CQI) is equal to 0, and notifies a network device side of the corresponding deactivated SCell.

Step 2: When the temperature of the terminal is lowered, the terminal side proactively activates a specific quantity of SCells.

The second solution has the following disadvantages.

Disadvantage 1: The second solution violates the 3GPP standard. The standard stipulates that a terminal cannot locally activate/deactivate an SCell, and can activate/deactivate an SCell only according to an instruction of a network device on a system side.

Disadvantage 2: When the terminal reports that the CQI is equal to 0, the network device on the system side possibly cannot perform scheduling. Consequently, a network compatibility problem occurs. The 3GPP standard stipulates that activation/deactivation of an SCell is determined by the system side, but does not stipulate when to activate/deactivate an SCell by the network device. When to activate/deactivate an SCell is determined by a system side vendor (usually related to load of the terminal), and different vendors have different algorithms. When the terminal reports that the CQI is equal to 0, the network device side possibly cannot deactivate a corresponding SCell, and the terminal side proactively deactivates a corresponding SCell. Consequently, the network compatibility problem occurs.

Disadvantage 3: A downlink packet loss occurs when the terminal locally deactivates the SCell, and consequently the network device side possibly cannot deactivate the corresponding SCell, causing a disadvantage of a cycle from activation to deactivation and then activation, and failing to achieve a heat alleviation purpose.

SUMMARY

Embodiments of this application provide a radio resource configuration adjustment method, a related apparatus, and a system, to resolve an overheating problem of a terminal by adjusting a radio resource configuration of the terminal.

According to a first aspect, an embodiment of this application provides a radio resource configuration adjustment method. The method includes: detecting, by user equipment, an overheating problem or that the overheating problem is alleviated, and sending, by the user equipment, a first message to a network device, where the first message is used to notify the network device that the overheating problem occurs in the user equipment or the overheating problem is alleviated; receiving, by the user equipment, a response message sent by the network device, where the response message is used to instruct the user equipment to perform one of the following operations, and the operations include: deactivating a secondary serving cell (Secondary Cell, SCell), activating a secondary serving cell, releasing a secondary serving cell, and adding a secondary serving cell; and deactivating, by the user equipment, a secondary serving cell, or activating a secondary serving cell, or releasing a secondary serving cell, or adding a secondary serving cell according to the response message.

With reference to the first aspect, optionally, when the user equipment detects the overheating problem, the first message includes assistance information; and the assistance information includes a quantity of activated-state downlink SCells supported by the user equipment and/or a quantity of activated-state uplink SCells supported by the user equipment.

With reference to the first aspect and any one of the foregoing possible implementations, when the user equipment detects that the overheating problem is alleviated, the first message does not include assistance information.

With reference to the first aspect, optionally, when the user equipment initiates a process of reporting the first message, the user equipment starts or restarts a first timer, where a length of the first timer is configured by the network device for the user equipment.

With reference to the first aspect, optionally, if content of the current first message is different from content of a previously reported first message, and the first timer does not run, the user equipment initiates reporting of the first message.

With reference to the first aspect, optionally, the user equipment receives first indication information sent by the network device, where the first indication information is used to notify the user equipment whether the user equipment can report the first message.

With reference to the first aspect, optionally, the user equipment sends a second message to the network device, where the second message includes second indication information, and the second indication information is used to indicate whether the user equipment supports the first message.

According to a second aspect, an embodiment of the present invention provides a radio resource configuration adjustment method, including: receiving, by a network device, a first message sent by the user equipment, where the first message is used to notify the network device that an overheating problem occurs in the user equipment or an overheating problem is alleviated; and sending, by the network device, a response message to the user equipment, where the response message is used to instruct the user equipment to perform any one of the following operations: deactivating a secondary serving cell, activating a secondary serving cell, releasing a secondary serving cell, and adding a secondary serving cell.

With reference to the second aspect, optionally, if the first message includes assistance information, the first message indicates that the user equipment detects the overheating problem. The assistance information includes a quantity of activated-state downlink SCells supported by the user equipment and/or a quantity of activated-state uplink SCells supported by the user equipment. The network device sends the response message to the user equipment, where the response message is used to instruct the user equipment to deactivate a secondary serving cell or release a secondary serving cell.

With reference to the second aspect, optionally, if the first message does not include assistance information, the first message indicates that the user equipment detects that the overheating problem is alleviated. The network device sends the response message to the user equipment, where the response message is used to instruct the user equipment to activate a secondary serving cell or add a secondary serving cell.

With reference to the second aspect, optionally, the network device sends a second message to the user equipment, where the second message includes a length value of a first timer. When the user equipment initiates a process of reporting the first message, the user equipment starts or restarts the first timer. A function of the first timer is as follows: if content of the current first message is different from content of a previously reported first message, and the first timer does not run, the user equipment initiates reporting of the first message.

With reference to the second aspect, optionally, the network device sends a third message to the user equipment, where the third message includes indication information used to notify the user equipment whether the user equipment can report the overheating problem.

With reference to the second aspect, optionally, the third message and the second message are a same message.

With reference to the second aspect, optionally, the network device receives a fourth message sent by the user equipment, where the fourth message includes indication information used to indicate whether the user equipment supports the first message.

According to a third aspect, an embodiment of the present invention provides user equipment, including a transmitter, a receiver, and a processor. The transmitter and the receiver are connected to the processor by using a bus. The processor detects an overheating problem or that an overheating problem is alleviated, and the transmitter sends a first message to a network device, where the first message is used to notify the network device that the overheating problem occurs in the user equipment or the overheating problem is alleviated. The receiver receives a response message sent by the network device, where the response message is used to instruct the user equipment to perform one of the following operations, and the operations include: deactivating a secondary serving cell (Secondary Cell, SCell), activating a secondary serving cell, releasing a secondary serving cell, and adding a secondary serving cell. The processor correspondingly deactivates a secondary serving cell, or activates a secondary serving cell, or releases a secondary serving cell, or adds a secondary serving cell according to the response message.

With reference to the third aspect, optionally, when the processor detects the overheating problem, the first message includes assistance information. The assistance information includes a quantity of activated-state downlink SCells supported by the user equipment and/or a quantity of activated-state uplink SCells supported by the user equipment.

With reference to the third aspect, optionally, when the processor detects that the overheating problem is alleviated, the first message does not include assistance information.

With reference to the third aspect, optionally, when the transmitter initiates a process of reporting the first message, the processor starts or restarts a first timer, where a length of the first timer is configured by the network device for the user equipment.

With reference to the third aspect, optionally, if content of the current first message is different from content of a previously reported first message, and the first timer does not run, the transmitter initiates reporting of the first message.

With reference to the third aspect, optionally, the receiver receives first indication information sent by the network device, where the first indication information is used to notify the user equipment whether the user equipment can report the first message.

With reference to the third aspect, optionally, the transmitter sends a second message to the network device, where the second message includes second indication information, and the second indication information is used to indicate whether the user equipment supports the first message.

According to a fourth aspect, an embodiment of the present invention provides a network device, including a transmitter, a receiver, and a processor. The transmitter and the receiver are connected to the processor by using a bus. The receiver receives a first message sent by the user equipment, where the first message is used to notify the network device that an overheating problem occurs in the user equipment or an overheating problem is alleviated. The transmitter sends a response message to the user equipment, where the response message is used to instruct the user equipment to perform any one of the following operations: deactivating a secondary serving cell, activating a secondary serving cell, releasing a secondary serving cell, and adding a secondary serving cell.

With reference to the fourth aspect, optionally, if the first message includes assistance information, the first message indicates that the user equipment detects the overheating problem. The assistance information includes a quantity of activated-state downlink SCells supported by the user equipment and/or a quantity of activated-state uplink SCells supported by the user equipment. The transmitter sends the response message to the user equipment, where the response message is used to instruct the user equipment to deactivate a secondary serving cell or release a secondary serving cell.

With reference to the fourth aspect, optionally, if the first message does not include assistance information, the first message indicates that the user equipment detects that the overheating problem is alleviated; and the transmitter sends the response message to the user equipment, where the response message is used to instruct the user equipment to activate a secondary serving cell or add a secondary serving cell.

With reference to the fourth aspect, optionally, the transmitter sends a second message to the user equipment, where the second message includes a length value of a first timer. When the transmitter initiates a process of reporting the first message, the user equipment starts or restarts the first timer. A function of the first timer is as follows: if content of the current first message is different from content of a previously reported first message, and the first timer does not run, the transmitter initiates reporting of the first message.

With reference to the fourth aspect, optionally, the network device sends a third message to the user equipment, where the third message includes indication information used to notify the user equipment whether the user equipment can report the overheating problem.

With reference to the fourth aspect, optionally, the third message and the second message are a same message.

With reference to the fourth aspect, optionally, the receiver receives a fourth message sent by the user equipment, where the fourth message includes indication information used to indicate whether the user equipment supports the first message.

According to a fifth aspect, an embodiment of the present invention provides a communications system, including user equipment and a network device, where the user equipment is any optional user equipment in the third aspect; and the network device is any optional network device in the fourth aspect.

According to a sixth aspect, a computer readable storage medium is provided. The readable storage medium stores program code used to implement the radio resource configuration method described in the first aspect. The program code includes an execution instruction used to run the radio resource configuration method described in the first aspect.

According to a seventh aspect, a computer readable storage medium is provided. The readable storage medium stores program code used to implement the radio resource configuration method described in the second aspect. The program code includes an execution instruction used to run the radio resource configuration method described in the second aspect.

According to an eighth aspect, this application provides a computer program product including an instruction. When the computer program product is run on a computer, the computer is enabled to execute the radio resource configuration method described in the first aspect.

According to a ninth aspect, this application provides a computer program product including an instruction. When the computer program product is run on a computer, the computer is enabled to execute the radio resource configuration method described in the second aspect.

According to the embodiments of the present invention, when the overheating problem occurs in the terminal, the terminal can reduce, without network disconnection and with standard stipulations complied, a radio resource configuration according to an instruction of the network device, thereby alleviating the overheating problem. When the overheating problem is alleviated, the terminal can increase, without network disconnection and with standard stipulations complied, the radio resource configuration according to an instruction of the network device, thereby implementing high-speed data transmission.

BRIEF DESCRIPTION OF DRAWINGS

To describe the technical solutions in the embodiments of the present invention or in the background technology more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

Figure 1:
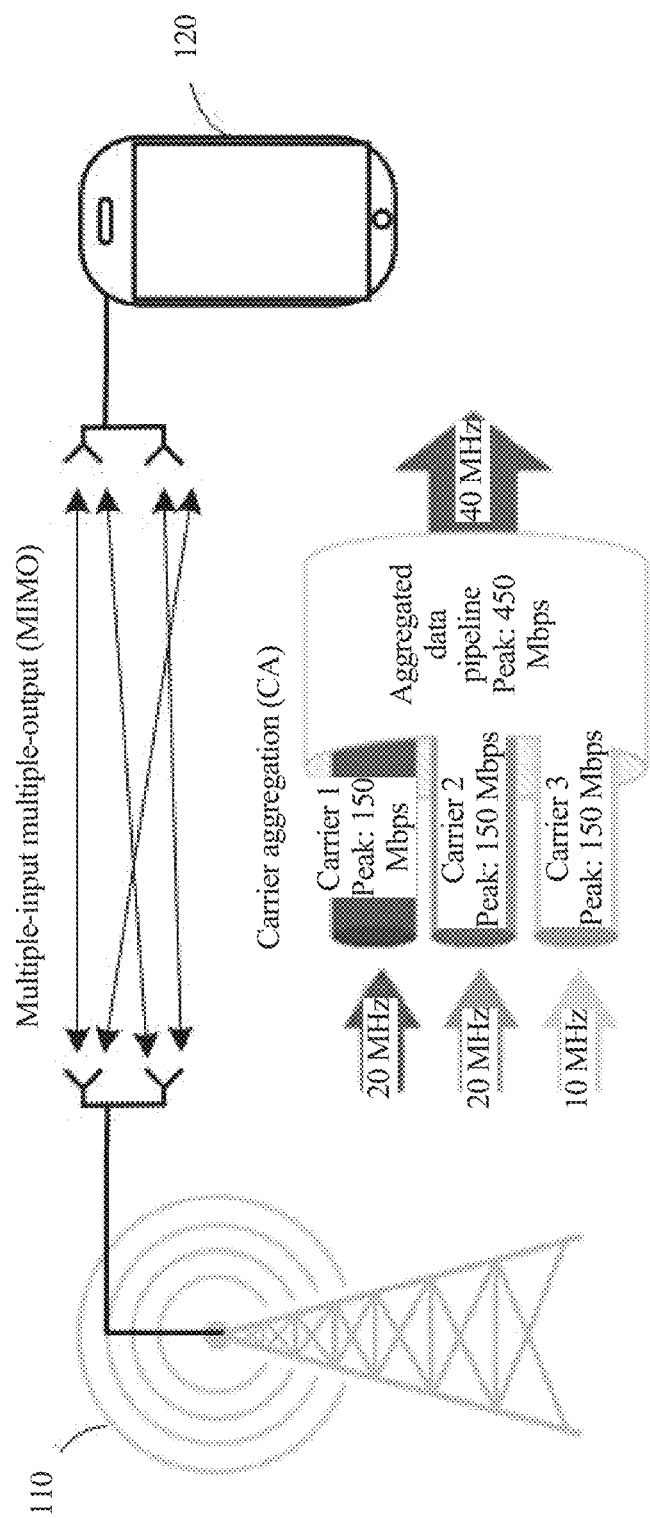
FIG. 1 is a schematic diagram of an architecture of a communications system in this application.

FIG. 1 shows a schematic diagram of an architecture of a communications system 100 in this application. The communications system may include a network device 110 and a terminal 120. The network device 110 and the terminal 120 communicate with each other by using an air interface technology. The air interface technology may include existing 2G (for example, Global System for Mobile Communications (Global System for Mobile Communications, GSM)), 3G (for example, Universal Mobile Telecommunications System (Universal Mobile Telecommunications System. UMTS). Wideband Code Division Multiple Access (Wideband Code Division Multiple Access, WCDMA), and Time Division-Synchronous Code Division Multiple Access (Time Division-Synchronous Code Division Multiple Access, TD-SCDMA)), 4G (for example, FDD LTE and TDD LTE), and a new radio access technology (New Radio Access Technology, New RAT), for example, forthcoming 4.5G and 5G.

The network device 110 may be a device configured to communicate with the terminal 120. The network device may be a BTS (Base Transceiver Station) in GSM or CDMA, or may be an NB (NodeB) in WCDMA, or may be an evolved NodeB (evolved Node B, eNB) in LTE, a relay station, an in-vehicle device, a wearable device, an access network device in a future 5G network, an access network device in a future evolved public land mobile network (Public Land Mobile Network, PLMN), or the like.

The terminal 120 may include a relay (Relay), and any device that can perform data communication with a base station may be considered as the terminal. The terminal 120 may be a cellular phone, a cordless telephone set, a Session Initiation Protocol (Session Initiation Protocol, SIP) phone, a wireless local loop (Wireless Local Loop, WLL) station, a personal digital assistant (Personal Digital Assistant, PDA), a handheld device having a wireless communication function, a computing device or another processing device connected to a wireless modem, an in-vehicle device, a wearable device, a mobile station in a future 5G network, a terminal device in a future evolved PLMN, or the like.

Currently, the communications system 100 can implement a higher data transmission rate through carrier aggregation CA and MIMO. The following briefly describes the two technologies.

Carrier aggregation means that a plurality of contiguous or non-contiguous component carriers are aggregated into a wider virtual frequency band in a same cell, to increase a rate of data transmission between a network device and a terminal. Carrier aggregation may be classified into three types based on a frequency band (band) of an aggregated component carrier; intra-band contiguous (intra-band contiguous) carrier aggregation, intra-band non-contiguous (intra-band non-contiguous) carrier aggregation, and inter-band non-contiguous (inter-band non-contiguous) carrier aggregation.

Figure 1A:
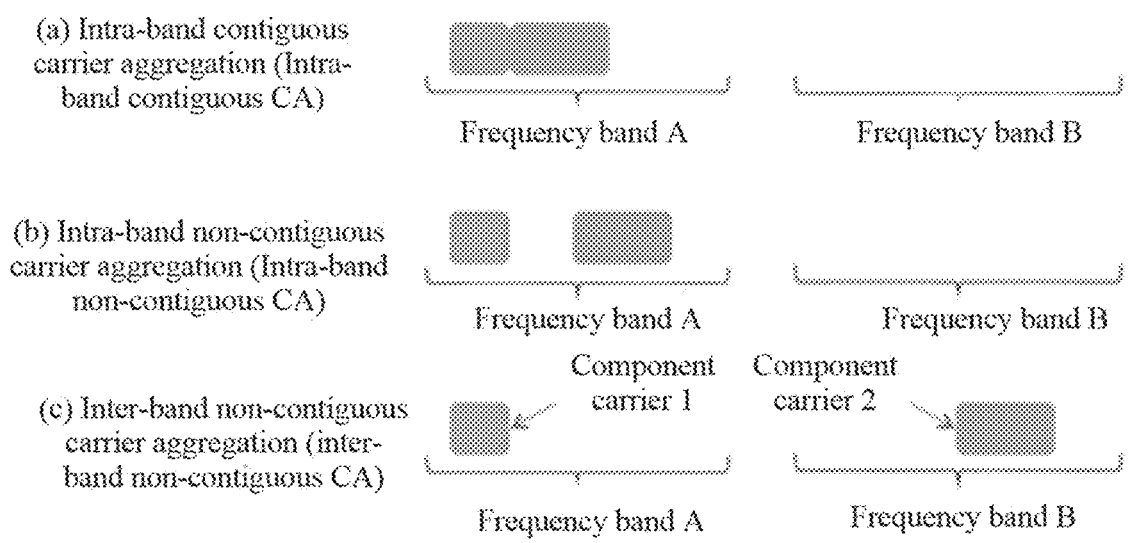
FIG. 1A is a schematic diagram of three carrier aggregation types in this application.

As shown in FIG. 1A, a first graph shows that intra-band contiguous carrier aggregation is implemented by aggregating adjacent component carriers on a same frequency band (band), a second graph shows that intra-band non-contiguous carrier aggregation is implemented by aggregating non-adjacent component carriers on a same frequency band, and a third graph shows that inter-band non-contiguous carrier aggregation is implemented by aggregating component carriers on different frequency bands.

For a terminal supporting carrier aggregation, one terminal corresponds to one serving cell (serving cell) set. The serving cell set includes one primary cell (Primary Cell, Pcell) and a plurality of secondary cells (Secondary Cell, Scell) corresponding to the terminal, and both the PCell and the SCell may be referred to as serving cells. The PCell is a cell that the terminal first accesses, is determined during connection establishment (connection establishment), is a main cell for communication between the terminal and a network device, and is configured to transmit RRC signaling (responsible for RRC communication between the PCell and the terminal).

After a Radio Resource Control (Radio Resource Control, RRC) connection is established, the network device may instruct, by using an RRCConnectionReconfiguration (RRCConnectionReconfiguration) message, the terminal to add (add) an SCell, in other words, instruct the terminal to configure an SCell, to provide additional radio resources. Similarly, the network device may instruct, by using an RRCConnectionReconfiguration message, the terminal to release an SCell in the serving cell set, in other words, instruct the terminal to configure an SCell. It can be understood that, corresponding to a terminal side, a network device side similarly configures or de-configures an SCell. After configuring or de-configuring an SCell, the network device side further needs to instruct the terminal to configure or de-configure a corresponding SCell, thereby implementing network compatibility.

One serving cell (PCell or SCell) corresponds to one component carrier. When a serving cell is configured for the terminal, a serving cell index value is assigned to the serving cell, and a serving cell index value of the PCell is always 0.

A PCell of a terminal always remains in an activated state, and an SCell is in a deactivated state when the SCell is added to (configured in) a serving cell set corresponding to the terminal. When necessary, the terminal may activate or deactivate the SCell in the serving cell set according to an instruction of the network device, and the terminal cannot proactively activate or deactivate the SCell in the serving cell set. It can be understood that, corresponding to a terminal side, a network device side similarly activates or deactivates an SCell. After activating or deactivating an SCell, the network device side further needs to instruct the terminal to activate or deactivate a corresponding SCell, thereby implementing network compatibility.

Specifically, when an SCell corresponding to the terminal is in the activated state, the terminal may send and receive data on a component carrier corresponding to the SCell. Further, when an uplink SCell corresponding to the terminal is in the activated state, the terminal may send data on a component carrier corresponding to the SCell. When a downlink SCell corresponding to the terminal is in the activated state, the terminal may receive data on a component carrier corresponding to the SCell.

It can be understood that a larger quantity of activated-state SCells corresponding to a terminal indicates a higher carrier aggregation configuration of the terminal and a faster data transmission rate.

It can be understood that, when the terminal configures a larger quantity of SCells, the terminal may activate a larger quantity of SCells. This is equivalent to indirectly increasing a quantity of activated-state SCells corresponding to the terminal. Therefore, a larger quantity of SCells configured by the terminal indicates a higher carrier aggregation configuration of the terminal and a faster data transmission rate.

MIMO means that data is sent and received by respectively using a plurality of radio frequency transmit links and a plurality of radio frequency receive links on a network device side and a terminal side, to increase a channel capacity without increasing a spectrum resource and antenna transmit power, thereby increasing a rate of data transmission between a network device and a terminal.

For the terminal, one MIMO layer (MIMO layer) corresponds to one pair of a radio frequency receive link and a radio frequency transmit link. In a current standard, after the terminal reports a maximum quantity of supported MIMO layers, the terminal needs to enable radio frequency receive links and radio frequency transmit links, where a quantity of the radio frequency receive links and radio frequency transmit links is at least equal to the quantity of supported MIMO layers. The network device schedules, at different time, the terminal to receive and send data by using different MIMO layers.

It can be understood that a larger maximum quantity of MIMO layers corresponding to one terminal indicates a higher MIMO configuration of the terminal and a faster data transmission rate.

In the communications system shown in FIG. 1, high-speed data transmission is implemented through carrier aggregation and MIMO. When the terminal runs during high-speed data transmission, the terminal encounters an overheating problem. In this case, a data transmission rate of the terminal needs to be reduced by reducing a carrier aggregation configuration or a MIMO configuration of the terminal, to resolve the overheating problem of the terminal. After the overheating problem of the terminal is alleviated, the carrier aggregation configuration or MIMO configuration needs to be increased to implement an as high as possible data transmission rate.

In the prior art, a radio resource configuration of the terminal is reduced by exiting a network and re-registering with the network, or by proactively deactivating an SCell by the terminal side. However, a network exit process and a network entry process may cause a network disconnection of the terminal, and consequently user experience is poor. In addition, proactively deactivating an SCell by the terminal side violates relevant stipulations of the 3GPP standard. Therefore, how to reduce, with relevant standard stipulations complied and a network connection of the terminal ensured, the radio resource configuration of the terminal to alleviate the overheating problem of the terminal is an urgent problem to be resolved.

Figure 2:
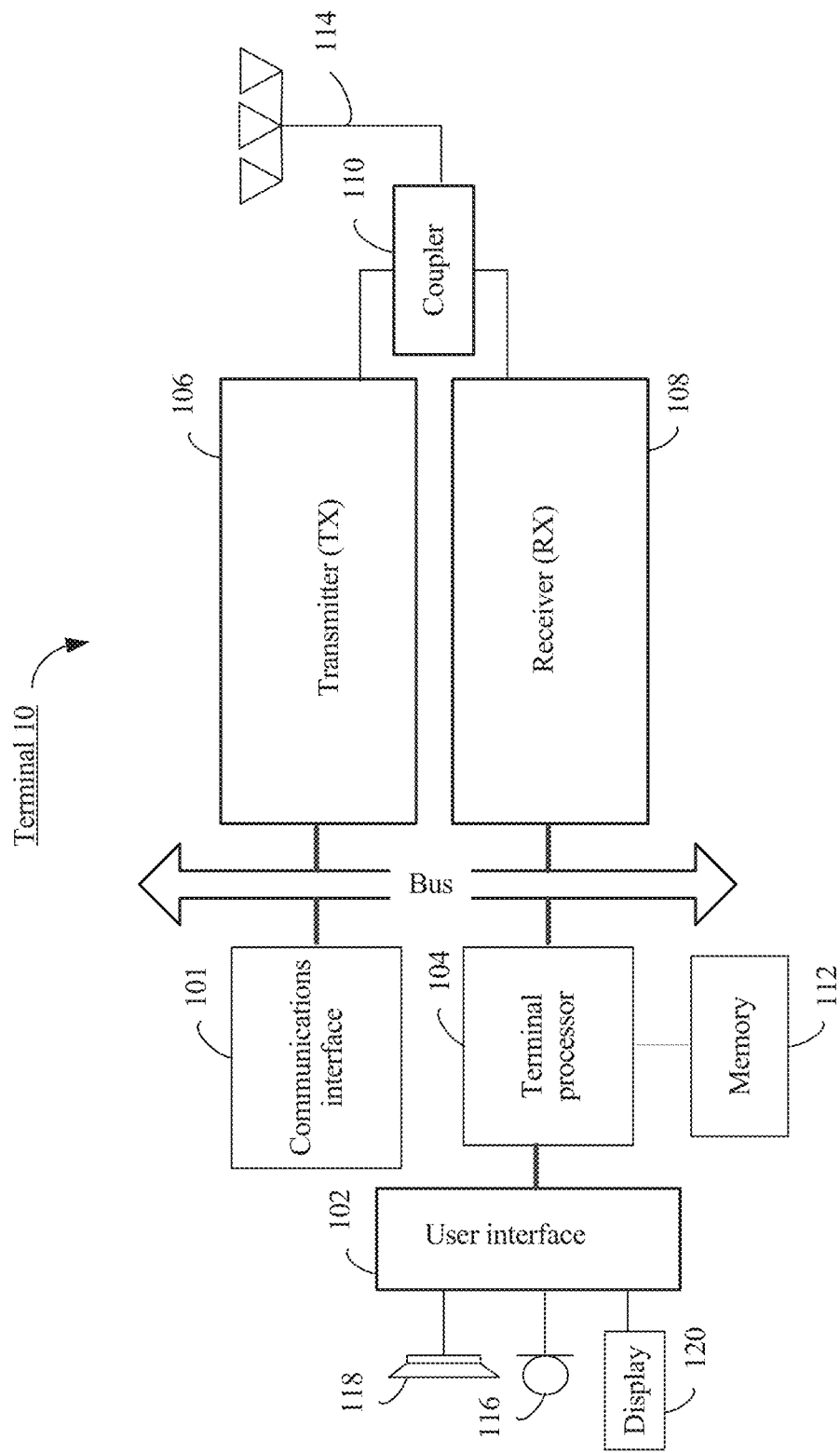
FIG. 2 is a schematic diagram of a hardware architecture of a terminal in this application.

Referring to FIG. 2, FIG. 2 shows a terminal 10 according to some embodiments of this application. The terminal 10 may be implemented as the terminal 120 in the communications system shown in FIG. 1. As shown in FIG. 2, the terminal 10 may include input/output modules (including an audio input/output module 118, a key input module 116, a display 120, and the like), a user interface 102, one or more terminal processors 104, a transmitter 106, a receiver 108, a coupler 110, an antenna 114, and a memory 112. These components may be connected by using a bus or in another manner, and the connection by using a bus is used as an example in FIG. 2.

A communications interface 101 may be used by the terminal 10 to communicate with another communications device, such as another terminal device or a base station.

The antenna 114 may be configured to convert electromagnetic energy in a transmission line into an electromagnetic wave in free space, or convert an electromagnetic wave in free space into electromagnetic energy in a transmission line. In FIG. 2, the terminal is provided with a plurality of antennas to support a MIMO function. The coupler 110 is configured to divide a communication signal received by the antenna 114 into a plurality of signals, and allocate the plurality of signals to a plurality of receivers 108.

The transmitter 106 may be configured to transmit a signal that is output by the terminal processor 104.

The receiver 108 may be configured to receive a signal received by the antenna 114.

In some embodiments of this application, the transmitter 106 and the receiver 108 may be considered as a wireless modem. There may be one or more transmitters 106 and receivers 108 in the terminal 10.

In addition to the transmitter 106 and the receiver 108 shown in FIG. 2, the terminal 10 may further include other communications components, such as a GPS module, a Bluetooth (Bluetooth) module, and a Wireless Fidelity (Wireless Fidelity, Wi-Fi) module.

The input/output modules may be configured to implement interaction between the terminal 10 and a user/an external environment, and may mainly include the audio input/output module 118, the key input module 116, the display 120, and the like. In specific implementation, the input/output modules may further include a camera, a touchscreen, a sensor, and the like. All the input/output modules communicate with the terminal processor 104 by using the user interface 102.

The memory 112 is coupled to the terminal processor 104, and is configured to store various software programs and/or a plurality of sets of instructions. In specific implementation, the memory 112 may include a high-speed random access memory, or may include a nonvolatile memory, such as one or more magnetic disk storage devices, a flash memory device, or another nonvolatile solid-state storage device. The memory 112 may store an operating system (hereinafter referred to as a system), for example, an embedded operating system such as Android, iOS, Windows, or Linux. The memory 112 may further store a network communications program. The network communications program may be used to communicate with one or more auxiliary devices, one or more terminal devices, and one or more network devices. The memory 112 may further store a user interface program. The user interface program may vividly display content of an application program by using a graphical operation interface, and receive, by using an input control such as a menu, a dialog box, or a button, a control operation performed on the application program by the user.

In some embodiments of this application, the memory 112 may be configured to store a program for implementing a radio resource configuration adjustment method on a side of the terminal 10 according to one or more embodiments of this application. For implementation of the radio resource configuration adjustment method provided in one or more embodiments of this application, refer to subsequent embodiments.

The terminal processor 104 may be configured to read and execute a computer readable instruction. Specifically, the terminal processor 14 may be configured to: invoke a program stored in the memory 112, for example, the program for implementing the radio resource configuration adjustment method on the side of the terminal 10 according to one or more embodiments of this application; and execute an instruction included in the program.

It should be noted that the terminal 10 shown in FIG. 2 is merely an implementation of the embodiments of the present invention. In actual application, the terminal 10 may further include more or fewer components. This is not limited herein.

Figure 3:
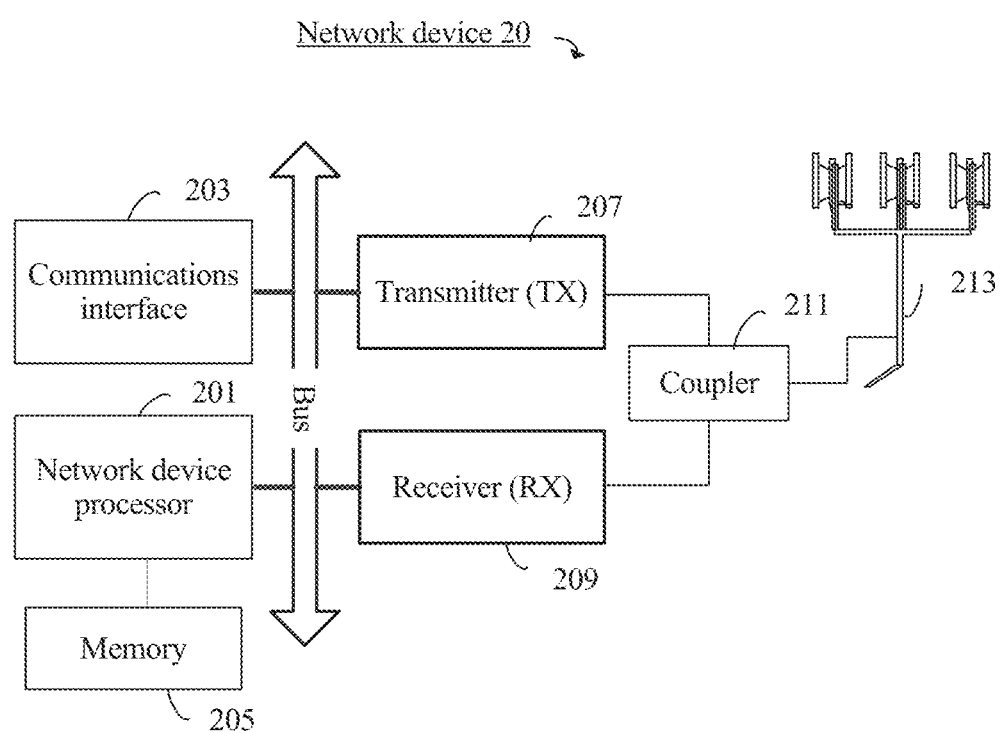
FIG. 3 is a schematic diagram of a hardware architecture of a network device in this application.

Referring to FIG. 3, FIG. 3 shows a network device 20 according to some embodiments of this application. The network device 20 may be implemented as the network device 110 in the communications system shown in FIG. 1. As shown in FIG. 3, the network device 20 may include a communications interface 203, one or more network device processors 201, a transmitter 207, a receiver 209, a coupler 211, an antenna 213, and a memory 205. These components may be connected by using a bus or in another manner, and the connection by using a bus is used as an example in FIG. 3.

The communications interface 203 may be used by the network device 20 to communicate with another communications device, such as another terminal or another network device. In specific implementation, the communications interface 203 may be a network communications interface, such as an LTE (4G) communications interface or a 5G or future New Radio communications interface. The communications interface is not limited to a wireless communications interface. The network device 20 may be further provided with a wired communications interface to support wired communication. For example, a backhaul link between network devices 20 is a wired communication connection.

The antenna 213 may be configured to convert electromagnetic energy in a transmission line into an electromagnetic wave in free space, or convert an electromagnetic wave in free space into electromagnetic energy in a transmission line. In FIG. 3, the network device 20 is provided with a plurality of antennas to support a MIMO function. The coupler 211 may be configured to divide a communication signal into a plurality of signals, and allocate the plurality of signals to a plurality of receivers 209.

The transmitter 207 may be configured to transmit a signal that is output by the network device processor 201, and transmit a signal to another network device or another terminal. The receiver 209 may be configured to receive a signal received by the antenna 213, and receive a signal transmitted by another network device or another terminal. In some embodiments of this application, the transmitter 207 and the receiver 209 may be considered as a wireless modem. There may be one or more transmitters 207 and receivers 209 in the network device 20.

The memory 205 is coupled to the network device processor 201, and is configured to store various software programs and/or a plurality of sets of instructions. In specific implementation, the memory 205 may include a high-speed random access memory, or may include a nonvolatile memory, such as one or more magnetic disk storage devices, a flash memory device, or another nonvolatile solid-state storage device. The memory 205 may store an operating system (hereinafter referred to as a system), for example, an embedded operating system such as uCOS, VxWorks, or RTLinux. The memory 205 may further store a network communications program. The network communications program may be used to communicate with one or more auxiliary devices, one or more terminal devices, and one or more network devices.

In some embodiments of this application, the memory 205 may be configured to store a program for implementing a radio resource configuration adjustment method on a side of the network device 20 according to one or more embodiments of this application. For implementation of the radio resource configuration adjustment method provided in one or more embodiments of this application, refer to subsequent embodiments.

The network device processor 201 may be configured to perform radio channel management, calling, communication link establishment and disconnection, cell handover control of user equipment in a current control area, and the like. In specific implementation, the network device processor 201 may include an administration module/communication module (Administration Module/Communication Module, AM/CM) (a center for speech channel switching and information exchanging), a basic module (Basic Module, BM) (configured to complete call processing, signaling processing, radio resource management, radio link management, and circuit maintenance functions), a transcoder and submultiplexer (Transcoder and Submultiplexer, TCSM) (configured to complete multiplexing/demultiplexing and transcoding functions), and the like.

In this embodiment of the present invention, the network device processor 201 may be configured to read and execute a computer readable instruction. Specifically, the network device processor 201 may be configured to: invoke a program stored in the memory 205, for example, the program for implementing the radio resource configuration adjustment method on the side of the network device 20 according to one or more embodiments of this application; and execute an instruction included in the program.

In specific implementation, the network device 20 may be implemented as a base transceiver station, a wireless transceiver, a basic service set (BSS), an extended service set (ESS), a NodeB, an eNodeB, or the like. The network device 20 may be implemented as base stations of several different types, such as a macro base station or a micro base station. The network device 20 may support different wireless technologies, such as a cell radio access technology or a WLAN radio access technology.

It should be noted that the network device 20 shown in FIG. 3 is merely an implementation of the embodiments of the present invention. In actual application, the network device 20 may further include more or fewer components. This is not limited herein.

Based on an application scenario in the communications system 100, the terminal 10, and the network device 20, an embodiment of the present invention provides a radio resource configuration adjustment method, to alleviate an overheating problem of the terminal when the overheating problem occurs because the terminal implements high-speed data transmission through carrier aggregation or MIMO.

Main invention principles of this application may be as follows:

When an overheating problem occurs, a terminal reports, to a network device, a message used to request the network device to reduce a radio resource configuration of the terminal. Correspondingly, after receiving the message, the network device sends, to the terminal, a message used to instruct the terminal to reduce the radio resource configuration. Correspondingly, after receiving the message sent by the network device, the terminal reduces the radio resource configuration, to alleviate the overheating problem.

After the overheating problem is alleviated, the terminal reports, to the network device, a message used to request the network device to increase the radio resource configuration of the terminal. Correspondingly, after receiving the message, the network device sends, to the terminal, a message used to instruct the terminal to increase the radio resource configuration. Correspondingly, after receiving the message sent by the network device, the terminal increases the radio resource configuration according to the message, to implement high-speed data transmission. In this way, the terminal can alleviate the overheating problem without network disconnection, and implement an as high as possible data transmission rate after alleviating the overheating problem.

In this application, when the overheating problem occurs in the terminal or the overheating problem is alleviated, all messages reported to the network device may be referred to as first messages, and all messages sent by the network device to the terminal may be referred to as response messages.

The following further describes the technical solutions in detail by using specific embodiments.

Embodiment 1

Step 1: When UE detects an overheating problem, the UE determines a cause of the problem.

How the UE detects the overheating problem and determines the cause of the overheating problem is determined by the user equipment.

Step 2: When the UE determines that the problem can be resolved by s18 reducing a quantity of activated SCells, an RRC layer of the UE triggers a message reporting process. The message reporting process is used to notify a base station that the overheating problem currently occurs in the UE or the overheating problem is resolved. An overheating problem indication message reported to the base station includes one piece of assistance information. The assistance information includes the following content.

Option 1: a quantity of activated-state SCells that can be supported by the UE, or a quantity of activated-state downlink SCells that can be supported by the UE and/or a quantity of activated-state uplink SCells that can be supported by the UE.

Further, the assistance information may include more-detailed information. For example, the quantity of SCells may be a quantity of SCells on intra-band contiguous CCs, and/or a quantity of SCells on intra-band non-contiguous CCs, and/or a quantity of SCells on inter-band non-contiguous CCs.

Option 2: an SCellIndex of an SCell expected by the UE to remain in an activated state, or an SCellIndex of a downlink SCell expected by the UE to remain in an activated state and/or an SCellIndex of an uplink SCell expected by the UE to remain in an activated state.

Option 3: a quantity of SCells whose deactivation is expected by the UE, or a quantity of downlink SCells whose deactivation is expected by the UE and/or a quantity of uplink SCells whose deactivation is expected by the UE.

Further, the assistance information may include more-detailed information. For example, the quantity of SCells may be a quantity of SCells on intra-band contiguous CCs, and/or a quantity of SCells on intra-band non-contiguous CCs, and/or a quantity of SCells on inter-band non-contiguous CCs.

Option 4: an SCellIndex of an SCell whose deactivation is expected by the UE, or an SCellIndex of a downlink SCell whose deactivation is expected by the UE, and/or an SCellIndex of an uplink SCell whose deactivation is expected by the UE.

Option 5: content indicating that the overheating problem of the UE is caused by currently activating excessive carriers.

A condition (for example, a temperature of the UE) for triggering the message reporting process by the UE is determined by the user equipment.

Option 6: a quantity of configured component carriers/serving cells/SCells that can be supported by the UE, or a quantity of configured downlink component carriers/serving cells/SCells that can be supported by the UE and/or a quantity of configured uplink component carriers/serving cells/SCells that can be supported by the UE.

Further, the assistance information may include more-detailed information. For example, the quantity of component carriers/serving cells/SCells may be classified into a quantity of intra-band contiguous CCs/serving cells/SCells, and/or a quantity of intra-band non-contiguous CCs/serving cells/SCells, and/or a quantity of inter-band non-contiguous CCs/serving cells/SCells.

Option 7: an SCellIndex of a configured SCell that can be supported by the UE, or an SCellIndex of a configured downlink SCell that can be supported by the UE and/or an SCellIndex of a configured uplink SCell that can be supported by the UE.

Option 8: a quantity of component carriers/serving cells/SCells whose release is expected by the UE, or a quantity of downlink component carriers/serving cells/SCells whose release is expected by the UE, and/or a quantity of uplink component carriers/serving cells/SCells whose release is expected by the UE.

Further, the assistance information may include more-detailed information. For example, the quantity of component carriers/serving cells/SCells may be classified into a quantity of intra-band contiguous CCs/serving cells/SCells, and/or a quantity of intra-band non-contiguous CCs/serving cells/SCells, and/or a quantity of inter-band non-contiguous CCs/serving cells/SCells.

Option 9: an SCellIndex of an SCell whose release is expected by the UE, or an SCellIndex of a downlink SCell whose release is expected by the UE and/or an SCellIndex of an uplink SCell whose release is expected by the UE.

Step 3: After the base station receives the overheating problem indication message reported by the UE, if the overheating problem indication message includes information about a quantity of activated-state SCells that can be currently supported by the UE, the base station determines whether to deactivate an SCell for the UE and determines which SCell is to be deactivated, or determines whether to release a configured component carrier/serving cell/SCell for the UE. If a decision result of the base station is to deactivate an SCell for the UE, a Media Access Control (Medium Access Control, MAC) layer of the base station generates activation/deactivation control signaling (Activation/Deactivation MAC CE), indicates the SCell that shall (shall) be deactivated in the activation/deactivation MAC CE, and sends the SCell to the UE. If a decision result of the base station is not to deactivate any SCell for the UE, the base station does not need to send any message to the UE.

Step 4: After the message in step 2 is sent, the following operations are performed.

If the UE receives the activation/deactivation MAC CE sent by the base station and the SCell that shall be deactivated is indicated in the activation/deactivation MAC CE, the UE deactivates a corresponding SCell according to an instruction of the base station.

After a period of waiting time, when the UE does not receive the activation/deactivation MAC CE that is sent by the base station and that includes an SCell deactivation instruction, or when the overheating problem of the UE persists even if the UE receives the activation/deactivation MAC CE that is sent by the base station and that includes an SCell deactivation instruction, the UE may choose to de-register from a network, and then re-register with the network. In addition, after re-registration and after a message of the base station for querying a radio access capability of the UE is received, the UE reports, to the base station in a radio access capability report message, a carrier aggregation capability that can be actually supported by the UE for currently alleviating the heat problem.

A length of the waiting time is determined by the UE, or configured by the base station for the UE by using dedicated RRC signaling or system information, or pre-stipulated in a standard.

Step 5: After the heat problem of the UE is alleviated without de-registration from a network and re-registration with the network, an RRC layer of the UE triggers a message reporting process. The message reporting process is used to notify a base station that the overheating problem currently occurs in the UE or the overheating problem is resolved. The overheating problem indication message reported to the base station does not include any assistance information.

Step 6: After the base station receives the overheating problem indication message that is reported by the UE and that does not include any assistance information, the base station learns that the above-mentioned overheating problem of the UE is alleviated, and the base station determines whether to activate more SCells for the UE and determines which SCell is to be activated, or determines whether to add a component carrier/a serving cell/an SCell for the UE. If a decision result of the base station is to activate an SCell for the UE, a MAC layer of the base station generates an activation/deactivation MAC CE, indicates the SCell that shall (shall) be activated in the activation/deactivation MAC CE, and sends the SCell to the UE. If a decision result of the base station is not to activate any SCell for the UE, the base station does not need to send any message to the UE.

Embodiment 2

Step 1: When UE detects an overheating problem, the UE determines a cause of the problem.

How the UE detects the overheating problem and determines the cause of the overheating problem is determined by the user equipment.

Step 2: When the UE determines that the problem can be resolved by reducing a quantity of activated SCells, an RRC layer of the UE triggers a message reporting process. The message reporting process is used to notify a base station of an updated radio access capability of the UE. The message reported to the base station includes various band combinations that can be currently supported by the UE and various downlink bandwidth classes and/or various uplink bandwidth classes that can be supported on each band in each band combination.

A condition (for example, a temperature of the UE) for triggering the message reporting process by the UE is determined by the user equipment.

Step 3: After the base station receives the foregoing message reported by the UE, the base station determines whether to accept an updated carrier aggregation capability of the UE, and notifies the UE of a decision result by using an RRC message. The decision result notification message may be an RRCConnectionReconfiguration message, or may be a newly defined RRC message. Alternatively, if the base station accepts the updated carrier aggregation capability of the UE, the base station adjusts, by using the RRCConnectionReconfiguration message, a quantity of carriers and a carrier frequency that are configured for the UE; or if the base station rejects the updated carrier aggregation capability of the UE, the base station does not send any message to the UE.

Step 4: After the message in step 2 is sent, the following operations are performed.

If the UE receives the RRCConnectionReconfiguration message that is sent by the base station and that is used to adjust the quantity of carriers and the carrier frequency that are configured for the UE, the UE performs carrier reconfiguration according to an instruction of the base station.

If the RRC message received by the UE and sent by the base station indicates that the base station rejects the updated carrier aggregation capability of the UE, or if the UE does not receive, after a period of waiting time, the RRCConnectionReconfiguration message that is sent by the base station and that is used to adjust the quantity of carriers and the carrier frequency that are configured for the UE, the UE may choose to de-register from a network, and then re-register with the network. In addition, after re-registration and after a message of the base station for querying a radio access capability of the UE is received, the UE reports, to the base station in a radio access capability report message, a carrier aggregation capability that can be actually supported by the UE for currently alleviating the heat problem.

A length of the waiting time is determined by the UE, or configured by the base station for the UE by using dedicated RRC signaling or system information, or pre-stipulated in a standard.

Step 5: After the heat problem of the UE is alleviated without de-registration from a network and re-registration with the network, an RRC layer of the UE triggers a message reporting process. The message reporting process is used to notify a base station of an updated radio access capability of the UE. The message reported to the base station includes various band combinations that can be currently supported by the UE and a bandwidth class that can be supported on each band in each band combination, or includes indication information that can be used to restore a previous carrier aggregation configuration. In more detail, it can be understood that the base station can learn, according to the indication information, that the UE restores a carrier aggregation configuration capability reported by the UE in a capability report message, so that the base station can configure and activate an SCell for the UE based on the capability.

Step 6: After the base station receives the foregoing message reported by the UE, the base station determines whether to accept an updated carrier aggregation capability of the UE, and notifies the UE of a decision result by using an RRC message. The decision result notification message may be the RRCConnectionReconfiguration message, or may be a newly defined RRC message. Alternatively, if the base station accepts the updated carrier aggregation capability of the UE, the base station adjusts, by using the RRCConnectionReconfiguration message, a quantity of carriers and a carrier frequency that are configured for the UE; or if the base station rejects the updated carrier aggregation capability of the UE, the base station does not send any message to the UE.

Embodiment 3

Step 1: When UE detects an overheating problem, the UE determines a cause of the problem.

How the UE detects the overheating problem and determines the cause of the overheating problem is determined by the user equipment.

Step 2: When the UE determines that the problem can be resolved by reducing a quantity of activated SCells, an RRC layer of the UE triggers a message reporting process. The message reporting process is used to notify a base station that a radio access capability of the UE is updated, and trigger the base station to re-obtain the updated radio access capability of the UE by using an existing UE capability obtaining process. The message reported to the base station includes a radio access capability update indication of the UE.

A condition (for example, a temperature of the UE) for triggering the message reporting process by the UE is determined by the user equipment.

Step 3: After the base station receives the foregoing message reported by the UE, the base station determines whether to re-obtain the updated radio access capability of the UE by using the existing UE capability obtaining process.

Step 4: After the message in step 2 is sent, the following operations are performed.

If the UE receives a UECapabilityEnquiry message sent by the base station, the UE reports the updated capability of the UE by using UECapabilityInformation. The reported capability includes at least an updated carrier aggregation capability of the UE. In other words, the reported capability includes various band combinations that can be currently supported by the UE and a bandwidth class that can be supported on each band in each band combination.

After a period of waiting time, if the UE does not receive the UECapabilityEnquiry message sent by the base station, the UE may choose to de-register from a network, and then re-register with the network. In addition, after re-registration and after a message of the base station for querying a radio access capability of the UE is received, the UE reports, to the base station in a radio access capability report message, a carrier aggregation capability that can be actually supported by the UE for currently alleviating the heat problem.

A length of the waiting time is determined by the UE, or configured by the base station for the UE by using dedicated RRC signaling or system information, or pre-stipulated in a standard.

Step 5: After the heat problem of the UE is alleviated without de-registration from a network and re-registration with the network, an RRC layer of the UE triggers a message reporting process. The message reporting process is used to notify a base station that a radio access capability of the UE is updated, and trigger the base station to re-obtain the updated radio access capability of the UE by using an existing UE capability obtaining process. The message reported to the base station includes a radio access capability update indication of the UE.

Step 6: After the base station receives the foregoing message reported by the UE, the base station determines whether to re-obtain the updated radio access capability of the UE by using the existing UE capability obtaining process.

Embodiment 4

Step 1: When UE detects an overheating problem, the UE determines a cause of the problem.

How the UE detects the overheating problem and determines the cause of the overheating problem is determined by the user equipment.

Step 2: When the UE determines that the problem can be resolved by disabling a specific quantity of radio frequency receive links and a specific quantity of radio frequency transmit links, an RRC layer of the UE triggers a message reporting process. The message reporting process is used to notify a base station that the overheating problem currently occurs in the UE or the overheating problem is resolved. The message reported to the base station includes one piece of assistance information. The assistance information includes the following content.

Option 1: a maximum quantity of downlink MIMO layers and/or a maximum quantity of uplink MIMO layers that can be currently supported by the UE.

Option 2: a maximum quantity of downlink MIMO layers and/or a maximum quantity of uplink MIMO layers that can be supported by the UE in each serving cell configured by the base station for the UE.

Option 3: a maximum quantity of downlink MIMO layers and/or a maximum quantity of uplink MIMO layers that can be supported by the UE on a frequency band corresponding to each serving cell configured by the base station for the UE.

Option 4: content indicating that the overheating problem of the UE is caused by an excessive maximum quantity of downlink MIMO layers and/or an excessive maximum quantity of uplink MIMO layers that need to be currently supported.

A condition (for example, a temperature of the UE) for triggering the message reporting process by the UE is determined by the user equipment.

Step 3: After the base station receives an overheating problem indication message reported by the UE, if the overheating problem indication message includes information about a maximum quantity of downlink MIMO layers and/or a maximum quantity of uplink MIMO layers that can be currently supported by the UE, the base station determines whether to reduce the maximum quantity of downlink MIMO layers and/or the maximum quantity of uplink MIMO layers of the UE. If a decision result of the base station is to reduce the maximum quantity of downlink MIMO layers and the maximum quantity of uplink MIMO layers of the UE, the base station reconfigures the maximum quantity of downlink MIMO layers and/or the maximum quantity of uplink MIMO layers for the UE by using an RRC connection reconfiguration process. If a decision result of the base station is not to reduce the maximum quantity of downlink MIMO layers and/or the maximum quantity of uplink MIMO layers of the UE, the base station does not need to send any message to the UE.

Step 4: After the message in step 2 is sent, the following operations are performed.

If the UE receives an RRCConnectionReconfiguration message that is sent by the base station and that is used to reduce the maximum quantity of downlink MIMO layers and/or the maximum quantity of uplink MIMO layers of the UE, the UE disables a corresponding quantity of radio frequency receive links and a corresponding quantity of radio frequency transmit links.

After a period of waiting time, if the UE does not receive the RRCConnectionReconfiguration message that is sent by the base station and that is used to reduce the maximum quantity of downlink MIMO layers and/or the maximum quantity of uplink MIMO layers of the UE, the UE may choose to de-register from a network, and then re-register with the network. In addition, after re-registration and after a message of the base station for querying a radio access capability of the UE is received, the UE reports, to the base station in a radio access capability report message, a MIMO capability that can be actually supported by the UE for currently alleviating the heat problem.

A length of the waiting time is determined by the UE, or configured by the base station for the UE by using dedicated RRC signaling or system information, or pre-stipulated in a standard.

Step 5: After the heat problem of the UE is alleviated without de-registration from a network and re-registration with the network, an RRC layer of the UE triggers a message reporting process. The message reporting process is used to notify a base station that the overheating problem currently occurs in the UE or the overheating problem is resolved. The message reported to the base station does not include any assistance information.

Step 6: After the base station receives the overheating problem indication message that is reported by the UE and that does not include any assistance information, the base station learns that the above-mentioned overheating problem of the UE is alleviated, and the base station determines whether to restore a maximum quantity of downlink MIMO layers and/or a maximum quantity of uplink MIMO layers that are configured for the UE. If a decision result of the base station is to restore the maximum quantity of downlink MIMO layers and/or the maximum quantity of uplink MIMO layers that are configured for the UE, the base station reconfigures the maximum quantity of downlink MIMO layers and/or the maximum quantity of uplink MIMO layers for the UE by using an RRC connection reconfiguration process. If a decision result of the base station is not to restore the maximum quantity of downlink MIMO layers and/or the maximum quantity of uplink MIMO layers that are configured for the UE, the base station does not need to send any message to the UE.

Embodiment 5

Step 1: When UE detects an overheating problem, the UE determines a cause of the problem.

How the UE detects the overheating problem and determines the cause of the overheating problem is determined by the user equipment.

Step 2: When the UE determines that the problem can be resolved by disabling a specific quantity of radio frequency receive links and a specific quantity of radio frequency transmit links, an RRC layer of the UE triggers a message reporting process. The message reporting process is used to notify a base station of an updated radio access capability of the UE. The message reported to the base station includes each band that can be currently supported by the UE and a downlink MIMO capability and/or an uplink MIMO capability that can be correspondingly supported on each band, and/or various band combinations and a downlink MIMO capability that can be correspondingly supported in each supported downlink bandwidth class on each band in each band combination and/or an uplink MIMO capability that can be correspondingly supported in each supported uplink bandwidth class on each band in each band combination.

A condition (for example, a temperature of the UE) for triggering the message reporting process by the UE is determined by the user equipment.

Step 3: After the base station receives the foregoing message reported by the UE, the base station determines whether to accept an updated MIMO capability of the UE, and notifies the UE of a decision result by using an RRC message. The decision result notification message may be the RRCConnectionReconfiguration message, or may be a newly defined RRC message. Alternatively, if the base station accepts the updated MIMO capability of the UE, the base station reconfigures, by using the RRCConnectionReconfiguration message, a quantity of downlink MIMO layers and/or a quantity of uplink MIMO layers for the UE; or if the base station rejects the updated MIMO of the UE, the base station does not send any message to the UE.

Step 4: After the message in step 2 is sent, the following operations are performed.

If the UE receives the RRC message that is sent by the base station and that is used to accept the updated MIMO capability of the UE, the UE disables a corresponding quantity of radio frequency receive links and a corresponding quantity of radio frequency transmit links.

If the RRC message received by the UE and sent by the base station indicates that the base station rejects the updated MIMO capability of the UE, or if the UE does not receive, after a period of waiting time, the RRCConnectionReconfiguration message that is sent by the base station and that is used to reconfigure the quantity of downlink MIMO layers and/or the quantity of uplink MIMO layers of the UE, the UE may choose to de-register from a network, and then re-register with the network. In addition, after re-registration and after a message of the base station for querying a radio access capability of the UE is received, the UE reports, to the base station in a radio access capability report message, a MIMO capability that can be actually supported by the UE for currently alleviating the heat problem.

A length of the waiting time is determined by the UE, or configured by the base station for the UE by using dedicated RRC signaling or system information, or pre-stipulated in a standard.

Step 5: After the heat problem of the UE is alleviated without de-registration from a network and re-registration with the network, an RRC layer of the UE triggers a message reporting process. The message reporting process is used to notify a base station of an updated radio access capability of the UE. The message reported to the base station includes each band that can be currently supported by the UE, a downlink MIMO capability and/or an uplink MIMO capability that can be correspondingly supported on each band, various band combinations that can be currently supported by the UE, and a downlink MIMO capability that can be correspondingly supported in each supported downlink bandwidth class on each band in each band combination and/or an uplink MIMO capability that can be correspondingly supported in each supported uplink bandwidth class on each band in each band combination.

Step 6: After the base station receives the foregoing message reported by the UE, the base station determines whether to accept an updated MIMO capability of the UE, and notifies the UE of a decision result by using an RRC message. The decision result notification message may be the RRCConnectionReconfiguration message, or may be a newly defined RRC message. Alternatively, if the base station accepts the updated MIMO capability of the UE, the base station reconfigures, by using the RRCConnectionReconfiguration message, a quantity of downlink MIMO layers and/or a quantity of uplink MIMO layers for the UE; or if the base station rejects the updated MIMO of the UE, the base station does not send any message to the UE.

Embodiment 6

Step 1: When UE detects an overheating problem, the UE determines a cause of the problem.

How the UE detects the overheating problem and determines the cause of the overheating problem is determined by the user equipment.

Step 2: When the UE determines that the problem can be resolved by disabling a specific quantity of radio frequency receive links and a specific quantity of radio frequency transmit links, an RRC layer of the UE triggers a message reporting process. The message reporting process is used to notify a base station that a radio access capability of the UE is updated, and trigger the base station to re-obtain the updated radio access capability of the UE by using an existing UE capability obtaining process. The message reported to the base station includes a radio access capability update indication of the UE.

A condition (for example, a temperature of the UE) for triggering the message reporting process by the UE is determined by the user equipment.

Step 3: After the base station receives the foregoing message reported by the UE, the base station determines whether to re-obtain the updated radio access capability of the UE by using the existing UE capability obtaining process.

Step 4: After the message in step 2 is sent, the following operations are performed.

If the UE receives a UECapabilityEnquiry message sent by the base station, the UE reports the updated capability of the UE by using UECapabilityInformation. The reported capability includes at least an updated MIMO capability of the UE. In other words, the reported capability includes various band combinations that can be currently supported by the UE, and a downlink MIMO capability that can be correspondingly supported in each supported downlink bandwidth class on each band in each band combination and/or an uplink MIMO capability that can be correspondingly supported in each supported uplink bandwidth class on each band in each band combination.

After a period of waiting time, if the UE does not receive the UECapabilityEnquiry message sent by the base station, the UE may choose to de-register from a network, and then re-register with the network. In addition, after re-registration and after a message of the base station for querying a radio access capability of the UE is received, the UE reports, to the base station in a radio access capability report message, a MIMO capability that can be actually supported by the UE for currently alleviating the heat problem.

A length of the waiting time is determined by the UE, or configured by the base station for the UE by using dedicated RRC signaling or system information, or pre-stipulated in a standard.

Step 5: After the heat problem of the UE is alleviated without de-registration from a network and re-registration with the network, an RRC layer of the UE triggers a message reporting process. The message reporting process is used to notify a base station that a radio access capability of the UE is updated, and trigger the base station to re-obtain the updated radio access capability of the UE by using an existing UE capability obtaining process. The message reported to the base station includes a radio access capability update indication of the UE.

Step 6: After the base station receives the foregoing message reported by the UE, the base station determines whether to re-obtain the updated radio access capability of the UE by using the existing UE capability obtaining process.

Both the assistance information related to carrier aggregation and the assistance information related to MIMO in the foregoing embodiments may be included in a message reported by the UE.

For the message reporting method of the UE in Embodiment 1 to Embodiment 6, in some optional embodiments, the network device may further notify the user equipment whether the user equipment can report the message. In this application, the network device may notify, by using the following two methods, the terminal whether the terminal can report the first message.

1. The base station notifies, by using dedicated RRC signaling, the UE whether a message reporting process initiated by the UE is supported. The message reporting process initiated by the UE may be any message reporting process in Embodiment 1 to Embodiment 6. A manner of the notification may be an explicit indication manner. In other words, one piece of indication information is used to notify the UE whether the message reporting process can be initiated; or two pieces of information are respectively used to notify the UE whether the message reporting process for carrier aggregation can be initiated, and/or to notify the UE whether the message reporting process for MIMO can be initiated. In addition, a condition may be specified for whether the base station notifies the UE of the indication information. In other words, when the base station configures a carrier aggregation function/a MIMO function for the UE, the base station needs to configure the indication information; otherwise, the base station does not configure the indication information.

2. The base station notifies, by using system information, the UE whether a message reporting process initiated by the UE is supported. The message reporting process initiated by the UE may be any message reporting process in Embodiment 1 to Embodiment 6. A manner of the notification may be an explicit indication manner. In other words, one piece of indication information is used to notify the UE whether the message reporting process can be initiated; or two pieces of information are respectively used to notify the UE whether the message reporting process for carrier aggregation can be initiated, and/or to notify the UE whether the message reporting process for MIMO can be initiated. In addition, a condition may be specified for whether the base station notifies the UE of the indication information. In other words, when the base station configures a carrier aggregation function/a MIMO function for the UE, the base station needs to configure the indication information; otherwise, the base station does not configure the indication information.

For the message reporting method of the UE in Embodiment 1 to Embodiment 6, in some optional embodiments, to control a frequency of reporting a message to the network device by the user equipment, a timer needs to be configured for the UE, and the timer is used to control whether the UE can initiate message transmission in the message reporting process. The message reporting process initiated by the UE may be any message reporting process in Embodiment 1 to Embodiment 7. A specific implementation is as follows:

When the UE needs to initiate any message reporting process in Embodiment 1 to Embodiment 6, if content of a currently reported message is the same as content of a message reported in a previously initiated message reporting process, the user equipment cannot initiate the message reporting process. If the content of the currently reported message is different from the content of the message reported in the previously initiated message reporting process, the UE checks whether a timer runs, where the timer is configured by the base station for the UE and is used to control the UE to initiate the message reporting. If the timer runs, the UE cannot initiate a currently required message reporting process; otherwise, if the timer does not run, the UE may initiate a currently required message reporting process.

When the UE initiates the message reporting process, the UE starts or restarts the timer used to control the UE to initiate the message reporting.

The foregoing method further includes the following features.

If the timer in the embodiments is configured by the base station, the UE may use a fact whether the base station configures the timer for the UE as an implicit indication of whether the base station supports the message reporting process initiated by the UE in Embodiment 1 to Embodiment 6. In other words, when the UE receives the timer configured by the base station for the UE, the UE can initiate the message reporting process; otherwise, the UE cannot initiate the message reporting process.

A length of the timer may be configured by the base station, or may be a value that is preset in a protocol. If the length of the timer is configured by the base station, the base station may configure the length by using dedicated signaling or may configure the length in a system message. If configuration is performed by using the dedicated signaling, the length and the indication information that is used to notify the UE whether the message reporting process in Embodiment 1 to Embodiment 6 can be initiated may be simultaneously configured in a same message; or only the length of the timer may be configured, without configuring the indication information.

For the message reporting method of the UE described in Embodiment 1 to Embodiment 6, if the user equipment is handed over from one base station to another base station, some steps may be correspondingly added to the foregoing method. The following two implementations are proposed herein.

When a source base station of the UE triggers the UE to perform a handover, if the source base station previously receives a message reported by the UE in step 2 in any manner in Embodiment 1 to Embodiment 6, the source base station adds, to a handover request message to be sent to a target base station, the message reported by the UE. For example, the message may be used as content of access stratum context (AS context) information included in a handover preparation message.

In addition, when the source base station of the UE triggers the UE to perform the handover, the handover request message sent by the source base station to the target base station further includes indication information that is configured by the source base station for the UE and that is used to notify the UE whether the message reporting process in Embodiment 1 to Embodiment 6 can be initiated, and/or a value of the timer used to control whether the UE can initiate message transmission in the message reporting process in Embodiment 1 to Embodiment 6. For example, the message may be used as content of AS Config information included in the handover preparation message.

When the UE receives an RRCConnectionReconfiguration message that is sent by a current serving cell and that includes MobilityControlInfo, if the UE sends, to the serving cell T ms before a current time in any manner in Embodiment 1 to Embodiment 6, the message reported in step 2, and if a target cell of the UE also supports the UE in initiating the message reporting process in any manner in Embodiment 1 to Embodiment 6, the UE initiates the message reporting process in a new serving cell in any manner in Embodiment 1 to Embodiment 6.

A length of T may be a numeric value that is preset in a protocol, or may be configured by the base station by using a dedicated message or a system message.

In an optional embodiment, after the user equipment accesses a network, when the UE supports the foregoing message reporting capability, the UE needs to add, to a radio capability report message, indication information used to indicate that the UE supports the foregoing message reporting.

The base station may determine, based on the indication information included in a capability message reported by the UE, specific UE to which indication information of a side of the base station and/or a value configuration of the timer need/needs to be delivered.

Carrier aggregation is introduced from the 3GPP standard Release 10. After this, CA+MIMO products keep pursuing a high rate and are continually upgraded, to meet a market requirement. CAT categories of user equipment products are continually upgraded, and future products have categories over 1G CAT 16. Compared with an increase of a product rate, the user equipment products are smaller and thinner in appearance. However, CA and MIMO are controlled through a single-direction instruction by a network in the 3GPP standard, and the user equipment passively performs execution. The UE cannot perform a service based on an actual situation due to a disadvantage that the CA+MIMO are controlled in a single direction by a system side. In a high rate mode, heat and power consumption problems cannot be alleviated because a quantity of channels of an RF and a baseband increases load of a related component. Consequently, user equipment cannot enjoy a high-speed service, and network capacity scheduling cannot be performed based on a status of the user equipment, causing resource waste. According to the embodiments of the present invention, when the user equipment encounters the overheating problem, CA and MIMO can be dynamically and proactively controlled online, thereby providing excellent communication experience, and making contribution to proper scheduling of the UE on the system side. In addition, a basis for a new, smaller, and thinner design is provided for appearance of the user equipment as power consumption and heat are smoothly alleviated.

Related parts of the method embodiments of the present invention may be mutually referenced. The apparatuses provided in the apparatus embodiments are configured to execute the methods provided in the corresponding method embodiments. Therefore, for the apparatus embodiments, refer to related parts in the related method embodiments.

Names of messages/frames and modules or units provided in the embodiments of the present invention are only examples, and other names may be used provided that functions of the messages/frames and the modules or units are the same.

A person of ordinary skill in the art should understand that all or part of the steps of the method specified in any foregoing embodiment may be implemented by a program instructing related hardware. The program may be stored in a readable storage medium of a device such as a flash, or an EEPROM. When the program runs, the program executes all or part of the steps described above.

In conclusion, according to the embodiments of the present invention, when the overheating problem occurs in the terminal, the terminal can reduce, without network disconnection and with standard stipulations complied, a radio resource configuration according to an instruction of the network device, thereby alleviating the overheating problem. When the overheating problem is alleviated, the terminal can increase, without network disconnection and with standard stipulations complied, the radio resource configuration according to an instruction of the network device, thereby implementing high-speed data transmission.

All or some of the foregoing embodiments may be implemented by using software, hardware, firmware, or any combination thereof. When software is used to implement the embodiments, the embodiments may be implemented wholly or partially in a form of a computer program product. The computer program product includes one or more computer instructions. When the computer program instructions are loaded and executed on the computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk), or the like.

What is claimed is:

1. A method implemented by a user equipment, comprising:

sending a first message to a network device upon detecting an overheating problem occurs by the user equipment and the user equipment preferring to reduce a number of maximum multiple-input, multiple-output (MIMO) layers, wherein the first message comprises assistance information, and wherein the assistance information comprises a preferred number of maximum MIMO layers that the user equipment prefers to be configured in downlink, and/or a preferred number of maximum MIMO layers that the user equipment prefers to be configured in uplink;

starting or restarting a first timer when the user equipment initiates a procedure of sending the first message, wherein a duration length of the first timer is from the network device;

receiving a response message from the network device, wherein the response message instructs the user equipment to reconfigure a number of maximum MIMO layers in the downlink or in the uplink;

detecting whether the first timer is running when content of a second message is different than previous content in a last transmission; and sending the second message when the overheating problem is alleviated and the first timer is not running, wherein the second message indicates that the overheating problem is alleviated by not comprising the assistance information.

2. The method of claim 1, further comprising turning off a corresponding number of radio frequency receiving links or a corresponding number of radio frequency transmitting links according to the response message.

3. User equipment, comprising:

a memory configured to store a program instruction; and one or more processors coupled to the memory and configured to invoke the program instruction to cause the user equipment to be configured to:

send a first message to a network device upon detecting an overheating problem occurs by the user equipment and the user equipment preferring to reduce a number of maximum multiple-input, multiple-output (MIMO) layers, wherein the first message comprises assistance information, and wherein the assistance information comprises a preferred number of maximum MIMO layers that the user equipment prefers to be configured in downlink, and/or a preferred number of maximum MIMO layers that the user equipment prefers to be configured in uplink;

start or restart a first timer when the user equipment initiates a procedure of sending the first message, wherein a duration length of the first timer is from the network device;

receive a response message from the network device, wherein the response message instructs the user equipment to reconfigure a number of maximum MIMO layers in the downlink or in the uplink;

detect whether the first timer is running when content of a second message is different than previous content in a last transmission; and send the second message when the overheating problem is alleviated and the first timer is not running, wherein the second message indicates that the overheating problem is alleviated by not comprising the assistance information.

4. The user equipment of the claim 3, wherein the one or more processors are configured to invoke the program instruction to cause the user equipment to be further configured to turn off a corresponding number of radio frequency receiving links or a corresponding number of radio frequency transmitting links according to the response message.

5. The user equipment of the claim 3, wherein the one or more processors are configured to invoke the program instruction to cause the user equipment to receive indication information from the network device, and wherein the indication information notifies the user equipment that the user equipment is able to report the first message.

6. The user equipment of the claim 3, wherein the one or more processors are configured to invoke the program instruction to cause the user equipment to send a third message to the network device, wherein the third message comprises indication information, and wherein the indication information indicates whether the user equipment supports the first message.

7. The user equipment of the claim 3, wherein the number of maximum MIMO layers in the downlink or in the uplink comprises the number of maximum MIMO layers in the downlink for each secondary serving cell (SCell) or the number of maximum MIMO layers in the uplink for each SCell.

8. The user equipment of the claim 3, wherein the number of maximum MIMO layers in the downlink or in the uplink comprises the number of maximum MIMO layers in the downlink for a frequency band corresponding to a serving cell or the number of maximum MIMO layers in the uplink for a frequency band corresponding to a serving cell.

9. The user equipment of the claim 3, wherein the one or more processors are configured to send the first message to the network device upon detecting the overheating problem occurs by the user equipment and the user equipment preferring to reduce a number of maximum MIMO layers comprises the one or more processors being configured to send the first message to the network device upon detecting the overheating problem occurs by the user equipment and the user equipment preferring to reduce a number of maximum MIMO layers and to reduce a number of secondary serving cells (SCells) in downlink or in uplink, and wherein the assistance information further comprises a number of SCells the user equipment prefers to be configured in the downlink or a number of SCells the user equipment prefers to be configured in the uplink.

10. The user equipment of the claim 9, wherein the response message from the network device further instructs the user equipment to release a SCell, and wherein the one or more processors are configured to invoke the program instruction to cause the user equipment to be further configured to release the SCell.

11. The method of the claim 1, further comprising receiving indication information from the network device, wherein the indication information notifies the user equipment that the user equipment is able to report the first message.

12. The of the claim 1, further comprising sending a third message to the network device, wherein the third message comprises indication information, and wherein the indication information indicates whether the user equipment supports the first message.

13. The method of the claim 1, wherein the number of maximum MIMO layers in the downlink or in the uplink comprises the number of maximum MIMO layers in the downlink for each SCell or the number of maximum MIMO layers in the uplink for each SCell.

14. The method of the claim 1, wherein the number of maximum MIMO layers in the downlink or in the uplink comprises the number of maximum MIMO layers in the downlink for a frequency band corresponding to a serving cell or the number of maximum MIMO layers in the uplink for a frequency band corresponding to a serving cell.

15. The method of the claim 1, wherein sending the first message to the network device upon detecting the overheating problem occurs by the user equipment and the user equipment preferring to reduce a number of maximum MIMO layers comprises sending the first message to the network device upon detecting the overheating problem occurs by the user equipment and the user equipment preferring to reduce a number of maximum MIMO layers and to reduce a number of secondary serving cells (SCells) in downlink or in uplink, and wherein the assistance information further comprises a number of SCells the user equipment prefers to be configured in the downlink or a number of SCells the user equipment prefers to be configured in the uplink.

16. The method of the claim 15, wherein the response message from the network device further instructs the user equipment to release a SCell, and wherein the method further comprises releasing the SCell.

17. A computer program product comprising instructions stored on a non-transitory computer-readable medium that, when executed by one or more processors, cause a user equipment to:
send a first message to a network device upon detecting an overheating problem occurs by the user equipment and the user equipment preferring to reduce a number of maximum multiple-input, multiple-output (MIMO) layers, wherein the first message comprises assistance information, and wherein the assistance information comprises a preferred number of maximum MIMO layers that the user equipment prefers to be configured in downlink, and/or a preferred number of maximum MIMO layers that the user equipment prefers to be configured in uplink;
start or restart a first timer when the user equipment initiates a procedure of sending the first message, wherein a duration length of the first timer is from the network device;
receive a response message from the network device, wherein the response message instructs the user equipment to reconfigure a number of maximum MIMO layers in downlink or in uplink;
detect whether the first timer is running when content of a second message is different than previous content in a last transmission; and
send the second message when the overheating problem is alleviated and the first timer is not running, wherein the second message indicates that the overheating problem is alleviated by not comprising the assistance information.

18. The computer program product of the claim 17, wherein the instructions further cause the user equipment to turn off a corresponding number of radio frequency receiving links or a corresponding number of radio frequency transmitting links according to the response message.

19. The method of claim 1, further comprising not initiating a process for reporting the second message when the content of the second message is the same as the previous content in the last transmission.

20. The user equipment of claim 3, wherein the one or more processors are configured to not initiate a process for reporting the second message when the content of the second message is the same as the previous content in the last transmission.

* * * * *